US006263485B1

(12) United States Patent
Schofield

(10) Patent No.: US 6,263,485 B1
(45) Date of Patent: *Jul. 17, 2001

(54) METHOD AND APPARATUS FOR DESCRIBING AN INTERFACE DEFINITION LANGUAGE-DEFINED INTERFACE, OPERATION, AND DATA TYPE

(76) Inventor: Andrew Schofield, Lindenbuehl 27, Cham, CH-6330 (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/680,270

(22) Filed: Jul. 11, 1996

(51) Int. Cl.⁷ .................................................. G06F 3/00
(52) U.S. Cl. .............................. 717/1; 707/104; 709/302
(58) Field of Search ..................................... 395/651, 682, 395/701; 707/104; 709/302; 717/1

(56) References Cited

U.S. PATENT DOCUMENTS

| 3,886,522 | 5/1975 | Barton et al. ........................... 714/49 |
| 4,941,170 | 7/1990 | Herbst .............................. 379/100.07 |

(List continued on next page.)

FOREIGN PATENT DOCUMENTS

| 0 381 645 | 8/1990 | (EP) . |
| WO 94/09428 | 4/1994 | (WO) . |

OTHER PUBLICATIONS

Omnicom, Inc., "A Tutorial On Abstract Syntax Notation One (ASN.1)", Transmission #25, Dec. 1986., p. 1–13.

Orfali, et al., "Client/Server Programming with OS/2 2.0 (Chapter 40)", 1992, pp. 951–978.

Ananda et al., "Astra–An Asynchronous Remote Procedure Call Facility", Conf. 11 International Conference on Distributed Computing Systems, Arlington, Texas, May 20, 1991, IEEE, pp. 172–179, XP000221855.

Chatterjee, A., "Futures: A Mechanism for Concurrency Among Objects", Proceedings of the Supercomputing Conference, Reno, Nov. 13–17, 1989, No. Conf. 2, Nov. 13, 1989, IEEE, pp. 562–567, XP000090924.

IBM, "Somobjects Developer Toolkit User Guide, Version 2.1 (Chapter 6)", Oct 1994, IBM, US, XP002047926.

Menon et al., "Object Replacement Using Dynamic Proxy Updates", Proceedings of the International Workshop on Configurable Distributed Systems,, IEEE, Jan. 1, 1994, pp. 82–91, XP002004310.

(List continued on next page.)

*Primary Examiner*—Mark R. Powell
*Assistant Examiner*—John Q. Chavis
(74) *Attorney, Agent, or Firm*—Thompson & Knight, LLP

(57) ABSTRACT

A method for defining Interface Definition Language-defined data types, operations, or interfaces is defined. In particular, an ASCII string descriptor is generated that identifies the data type, interface, or operation. Characters are used to identify the base types of any data types, while a combination of characters and numerals are used to identify compound types and characteristics of those compound types. For operations, characters and numerals are used to identify the number and types of parameters, number of exceptions, and number of contexts contained in the operation. Interfaces are described using a numeral that indicates the number of operations included in the interfaces. By converting the original IDL description to an ASCII string, generic functions can be created to transport object calls across heterogeneous systems.

7 Claims, 7 Drawing Sheets

U.S. PATENT DOCUMENTS

| | | | |
|---|---|---|---|
| 5,204,947 | 4/1993 | Bernstein | 345/357 |
| 5,247,676 | 9/1993 | Ozur et al. | 709/304 |
| 5,428,792 * | 6/1995 | Conner et al. | 395/708 |
| 5,457,797 | 10/1995 | Butterworth et al. | 709/302 |
| 5,481,721 | 1/1996 | Serlet et al. | 709/303 |
| 5,511,197 | 4/1996 | Hill et al. | 709/303 |
| 5,515,508 | 5/1996 | Pettus et al. | 709/203 |
| 5,535,386 | 7/1996 | Wang | 707/203 |
| 5,551,035 | 8/1996 | Arnold et al. | 709/303 |
| 5,568,639 | 10/1996 | Wilcox et al. | 707/200 |
| 5,603,027 | 2/1997 | Ohkami | 707/203 |
| 5,613,148 | 3/1997 | Bezviner et al. | 709/203 |
| 5,621,885 | 4/1997 | Del Vigna, Jr. | 714/13 |
| 5,627,979 * | 5/1997 | Chang et al. | 707/104 |
| 5,642,511 * | 6/1997 | Chow et al. | 395/701 |
| 5,664,177 | 9/1997 | Lowry | 707/100 |
| 5,664,206 | 9/1997 | Murow et al. | 704/8 |
| 5,671,416 | 9/1997 | Elson | 717/2 |
| 5,675,805 * | 10/1997 | Boldo et al. | 395/706 |
| 5,689,689 | 11/1997 | Meyers et al. | 709/400 |
| 5,701,490 | 12/1997 | Safanov | 717/5 |
| 5,724,503 | 3/1998 | Kleinman et al. | 714/57 |
| 5,732,219 | 3/1998 | Blumer | 709/227 |
| 5,732,270 | 3/1998 | Foody et al. | 709/303 |
| 5,742,762 | 4/1998 | Scholl | 709/200 |
| 5,758,163 | 5/1998 | Safanov | 717/8 |
| 5,761,511 | 6/1998 | Gibbons et al. | 717/5 |
| 5,761,656 | 6/1998 | Ben-Shachar | 707/4 |
| 5,768,564 | 6/1998 | Andrews et al. | 717/5 |
| 5,778,228 | 7/1998 | Wei | 709/304 |
| 5,848,273 * | 12/1998 | Fontana et al. | 395/701 |
| 5,860,010 | 1/1999 | Attal | 717/6 |
| 5,860,072 | 1/1999 | Schofield | 707/101 |
| 5,897,636 | 4/1999 | Kaeser | 707/100 |

OTHER PUBLICATIONS

Menon et al., Asynchronous Events Tools for Distributed Programming in Concurrent Object Based Systems, 1993., p. 1–32.

OMG, Object Transaction Service, 1994.

OMG, ORB Products, Chapter 21, pp. 299–326 (1995).

Hall et al., "Window Sockets—An Open Interface for Network Programming Under Microsoft Windows", Jan. 20, 1993.

Wijingaarden et al., "Revised Report on the Algorithmic Language ALGOL 68", (1976), Springer–Verlag, New York, Chapter 7: Modes and Nests, pp. 98–107, XP002047543.

Neufeld et al., "The Design and Implementation of an ASN.1–C Compiler", IEEE Transactions on Software Engineering, vol. 16, No. 10, Oct. 1990, New York, pp. 1209–1220, XP000162480.

"Data Structures Made Accesible From Outside the Application", IBM Technical Disclosure Bulletin, vol. 35, No. 2, Jul. 1992, Armonk, NY, pp. 255–256, XP000313288.

Katwijk, J. Van, "Addressing Types and Objects in ADA", Software Practice and Experience, vol. 17, No. 5, May 1987, Great Britain, pp. 319–343, XP002030193.

"The Common Object Request Broker Architecture and Specification", Rev. 2.0, Chap. 1–4, Jul. 1995.

Jacquemot, C. et al., "Cool: The Chorus CORBA Compliant Framework", Intellectual Leverage: Digest of Papers of the Spring Computer Soci International Conference (Compcon), San Francisco, Feb. 28–Mar. 4, 1994, No.—, Feb. 28, 1994, IEEE, pp. 132–141, XP00047938.

"Distributed Object Activation and Communication Protocols", IBM Technical Disclosure Bulletin, vol. 37, No. 7, Jul. 1994, pp. 539–542, XP002009565.

Kinane et al., "Distributing broadband multimedia systems using CORBA", Computer Communications, Jan. 1996, Elsevier, UK, vol. 1, pp. 13–21.

Trehan et al., "Toolkit for Shared Hypermedia on a Distributed Object Oriented Architecture", Proceedings ACM Multimedia 93, Proc. of First ACM International Conference on Multimedia (1993), pp. 175–181.

Yang, et al., "CORBA: A Platform for Distributed Object Computing (A State of the Art Report on OMG/CORBA)", Operating Systems Review (SIGOPS), vol. 30, No. 2, Apr. 1, 1996, pp. 4–31.

Zelesko et al., "Specializing Object–Oriented RPC for Functionality and Performance", Distributed Computing System, 1996 Inter. Conf., pp. 175–187 (1996).

Ravindran et al., "Object–Oriented Communication Structures for Multimedia Data Transport", IEEE Journal on Selected Areas in Communications, vol. 14, Iss. 7, Sep. 1996, pp. 1310–1375.

Jagannathan, V. et al., "Collaborative Infrastructures Using the WWW and CORBA–Based Environments", Proc. of WET ICE, Jun. 19, 1996, pp. 292–297.

Ross, M., "Portability by Design", Dr. Dobb's Journal, vol. 19, No. 3, pp. 40–46, Mar. 1994.

Box, D., "Q&A: ActivX/COM.", Microsoft Systems Journal., vol. 11, No. 11, Pp. 91–98, Nov. 1996.

Vogel et al., "Understanding and IDL Lesson one: DCE and COBRA", Services in Distributed & Networked Environments, 1996 3rd Int'l Workshop, pp. 114–121, 1996.

North, K., "Understanding OLE: Microsoft's Language–Independent, Binary Standard for Object Sharing on Desktops and Across Networks", DBMS, vol. 8, No. 7, pp. 50–57, Jun. 1995.

Pompeii, J., "Distributed Objects and the Internet", Dr. Dobb's Journal on CD–ROM, vol. 21, No. 3, pp. 1–9, Mar. 1996.

Neufeld et al., "An Overview of ASN.1", Computer Networks and ISDN Systems, vol. 23, No. 5, Feb. 1, 1992, pp. 393–415, XP000249379.

Article by Wijngaarden et al., entitled "Revised Report on the Algorithmic Language ALGOL 68". 1976, Springer–Verlag, New York, Chapter 7: Modes and Nests, pp. 98–107, XP002047543.

Gerald W. Neufeld et al.: "The Design and Implementation of An ASN. 1–C Compiler" IEEE Transactions on Software Engineering, vol. 16, No. 10, Oct. 1990, New York, US—pp. 1209–1220, XP000162480.

"Data Structures Made Accessible from Outside the Application", IBM Technical Disclosure Bulletin, vol. 35, No. 2, Jul. 1992, Armonk, NY US, pp. 255–256, XP000313288.

J. Van Katwijk: "Addressing Types and Objects in Ada"Software Practice & Experience, vol. 17, No. 5, May 1987, Chihester, Sussex, GB, pp. 319–343, XP002030193.

* cited by examiner

METHOD AND APPARATUS FOR DESCRIBING AN INTERFACE DEFINITION LANGUAGE-DEFINED INTERFACE, OPERATION, AND DATA TYPE

RELATED APPLICATIONS

The following related U.S. applications are hereby incorporated by reference: U.S. application Ser. No. 08/678,681 entitled "Method and Apparatus Using Parameterized Vectors For Converting Interface Definition Language-Defined Data Structures into a Transport and Platform Independent Format" by A. Schofield, filed Jul. 11, 1996; U.S. application Ser. No. 08/678,298 entitled "Data Structure Representing An Interface Definition Language Source File" by A. Schofield, filed Jul. 11, 1996; U.S. application Ser. No. 08/680,203 entitled "Method and Apparatus for Transporting Interface Definition Language-Defined Data Structures Between Heterogeneous Systems" by A. Schofield, filed Jul. 11, 1996, now U.S. Pat. No. 5,860,072; U.S. application Ser. No. 08/678,295 entitled "Method and Apparatus for Performing Distributed Object Calls" by A. Schofield filed Jul. 11, 1996; U.S. application Ser. No. 08/680,202 entitled "Method and Apparatus for Asynchronously Calling and Implementing Objects" by A. Schofield, filed Jul. 11, 1996; U.S. application Ser. No. 08/680,266 entitled "Method and Apparatus for Performing Distributed Object Calls using Proxies and Memory Allocation" by A. Schofield filed Jul. 11, 1996.

BACKGROUND OF THE INVENTION

1. Field of the Invention

The present invention relates to a method and apparatus for describing an interface definition language-defined interface, operation, and data type. In particular, data types are described using a series of ASCII characters.

2. Background

Distributed object computing combines the concepts of distributed computing and object-oriented computing. Distributed computing consists of two or more pieces of software sharing information with each other. These two pieces of software could be running on the same computer or on different computers connected to a common network. Most distributed computing is based on a client/server model. With the client/server model, two major types of software are used: client software, which requests the information or service, and server software, which provides or implements the information or service.

Object-oriented computing is based upon the object model where pieces of code called "objects"—often abstracted from real objects in the real world—contain data and may have actions (also known as "Operations") performed on them. An object is defined by its interface (or "class" in C++ parlance). The interface defines the characteristics and behavior of a kind of object, including the operations that can be performed on objects of that interface and the parameters to that operation. A specific instance of an object is identified within a distributed object system by a unique identifier called an object reference.

In a distributed object system, a client application sends a request (or "invocation" or "object call") to a server application containing an indication of the operation to be performed on a specific object, the parameters to that operation, the object reference for that object, and a mechanism to return error information (or "exception information") about the success or failure of a request. The server application receives the request and carries out the request via a server "implementation." The implementation satisfies the client's request for an operation on a specific object. The implementation includes one or more methods, which are the portions of code in the server application that actually do the work requested of the implementation. If the implementation is carried out successfully, the server application returns a response to the client, if necessary. The server application may also return exception information.

To standardize distributed object systems, the Object Management Group ("OMG"), a consortium of computer software companies, proposed the Common Object Request Broker Architecture ("CORBA"). Under the CORBA standard, an Object Request Broker ("ORB") provides a communication hub for all objects in the system passing the request to the server and returning the response to the client. Commercial ORB's are known in the art and a common type is IBM's System Object Model ("SOM"). On the client side, the ORB handles requests for the invocation of a method and the related selection of servers and methods. When an application sends a request to the ORB for a method to be performed on an object, the ORB validates the arguments contained in the request against the interface for that object and dispatches the request to the server, starting it if necessary. On the server side, the ORB uses information in the request to determine the best implementation to satisfy the request. This information includes the operation the client is requesting, what type of object the operation is being performed on, and any additional information stored for the request. In addition, the server-side ORB validates each request and its arguments. The ORB is also responsible for transmitting the response back to the client.

Both the client application and the server application must have information about the available interfaces, including the objects and operations that can be performed on those objects. To facilitate the common sharing of interface definitions, OMG proposed the Interface Definition Language ("IDL"). IDL is a definition language (not a programming language) that is used to describe an object's interface; that is, the characteristics and behavior of a kind of object, including the operations that can be performed on those objects.

IDL interfaces define a set of operations that a client can invoke on an object. An interface can declare one or more exceptions, which indicate that an IDL operation did not perform successfully. Operations may receive parameters and return a return value. Each parameter to an operation may have a "direction" that indicates whether the value is passed from client to server ("in"), from server to client ("out"), or in both directions ("inout"). The parameter also has a data type that constrains its possible values. Operations may also optionally have a "one-way" attribute, which specifies which invocation semantics the communication service must provide for invocations of a particular operation. When a client invokes an operation with the one-way attribute, the invocation semantics are "best-effort", implying that the operation will be implemented by the server at most once. If an attempt to implement the operation fails, the server does not attempt to implement the operation again. An operation with the one-way attribute must specify a void return type and must not contain any output parameters.

Data types are used to describe the accepted values of IDL operation parameters, exceptions, and return values. IDL supports two categories of data types: basic and compound. Basic types include short integers, long integers, long long integers, unsigned long integers, unsigned short integers, floating points, double, character, boolean, and octet. Compound types include enum, string, struct, array, union, sequence, and "any" types. The struct type is similar to a C structure; it lets interface designers create a complex data type using one or more type definitions. The sequence type lets interface designers pass a variable-size array of objects. The "any" type can represent any possible data type—basic or compound.

IDL is designed to be used in distributed object systems implementing OMG's ("CORBA"), Revision 2.0 specification, which is incorporated by reference herein. In a typical system implementing the CORBA specification, interface definitions are written in an IDL-defined source file (also known as a "translation unit"). The source file is compiled by an IDL compiler that generates programming-language-specific files, including client stub files, server stub files, and header files. Client stub files are language-specific mappings of IDL operation definitions for an object type into procedural routines, one for each operation. When compiled by a language-specific compiler and linked into a client application, the stub routines may be called by the client application to invoke a request. Similarly, the server stub files are language-specific mappings of IDL operation definitions for an object type (defined by an interface) into procedural routines. When compiled and linked into a server application, the server application can call these routines when a corresponding request arrives. Header files are compiled and linked into client and server applications and are used to define common data types.

One drawback to using strict IDL-defined operations within an application is the inability to use these operations in generic functions. Generic functions can be utilized across heterogeneous platforms and, therefore, promote code reuse across these varying platforms. In the prior art, however, each application must call a specific client stub function to access an operation contained in a particular interface. As additional operations are added to the interface, new stub functions must be generated. Thus, the application can become more and more complex over time.

Another drawback to strict IDL-defined operations is the inability to compare interfaces to determine compatibility. In certain instances, a server may not be able to provide a requested service because the server does not accommodate that interface and its associated operations. The server may, however, have a compatible interface that provides a similar operation. Currently, there is no method available for determining compatibility of interfaces and/or operations.

Accordingly, there is a need for using IDL-defined interfaces, operations, and parameters in generic functions.

Additionally, there is a need for facilitating the comparison of IDL-defined interfaces, operations, and data types.

SUMMARY OF THE INVENTION

The present invention is directed to a method and system and computer program product that satisfies the need for using IDL-defined interfaces, operations, and data types in generic functions. In addition, the method of the present invention satisfies the need for facilitating the comparison of IDL-defined interfaces, operations, and parameters. The method includes the step of generating a new ASCII string descriptor that identifies the interface, operation, or parameter. More particularly, characters are used to identify the base type of any parameter, while a combination of characters and numerals are used to identify compound type parameters and characteristics of those compound type parameters. For operations, characters and numerals are used to identify the number and types of parameters, number of exceptions, and number of contexts contained in the operation. Interfaces are described using a numeral that indicates the number of operations included in the interfaces.

By converting the original IDL description to an ASCII string, generic functions can be created to transport object calls across heterogeneous systems. Moreover, code generators can simply emit strings to fully describe an interface rather than a complex link of data structures. In addition, individual operations and data types can easily be described using the method of the present invention.

A more complete understanding of the method for describing data types, operations, and interfaces will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Reference will now be made in detail to the preferred embodiments of the invention, examples of which are illustrated in the accompanying drawings. Wherever possible, the same reference numbers will be used throughout the drawings to refer to the same or like parts.

I. System Overview

Figure 1:
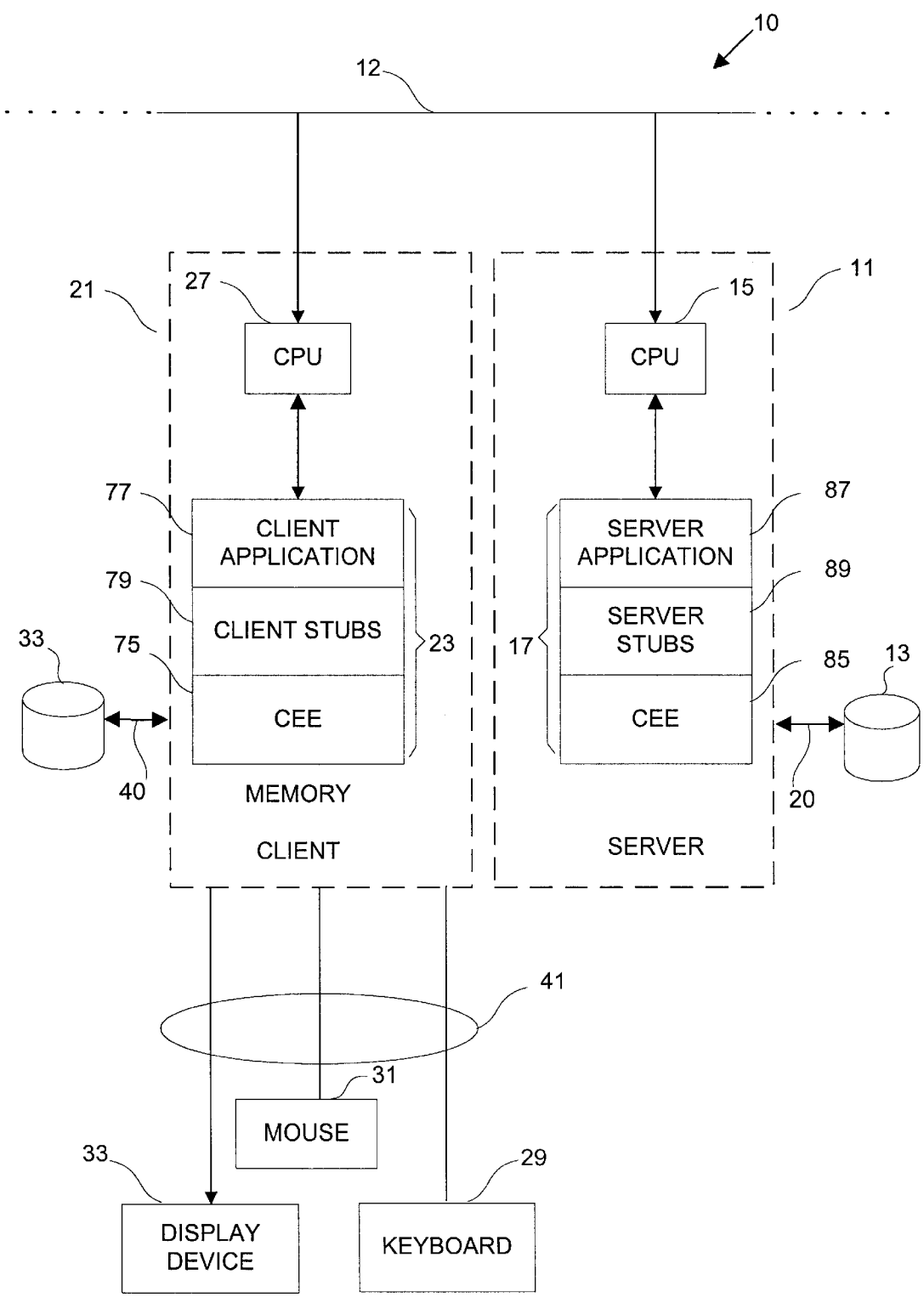
FIG. 1 is a diagram of a client/server system using the method of the present invention.

As illustrated in FIG. 1, the method of the present invention is designed for use in a distributed (client/server) computing environment 10. The client and server systems are connected by network connections 12, such as internet connections or the connections of a local area network. A server computer 11 communicates over a bus or I/O channel 20 with an associated disk storage subsystem 13. The server system 11 includes a CPU 15 and a memory 17 for storing current state information about program execution. A portion of the memory 17 is dedicated to storing the states and variables associated with each function of the program which is currently executing on the client computer. The client computer 21 similarly includes a CPU 27 and associated memory 23, and an input device 29, such as a keyboard 29, or a mouse 31 and display device 42, such as a video display terminal ("VDT"). The client CPU communicates over a bus or I/O channel 40 with a disk storage subsystem 33 and via I/O channel 41 with the keyboard 29, VDT 33 and mouse 31. Both computers are capable of reading various types of media, including floppy disks and CD-ROMs.

The client memory 27 includes a client application 77 and client stubs 79 loaded therein. Similarly, the server memory 17 includes a server application 87 and server stubs 89. In addition, both the client memory and the server memory include an execution environment ("CEE") 75, 85 (as discussed below).

The client/server model as shown in FIG. 1 is merely demonstrative of a typical client/server system. Within the context of the present invention, the "client" is an application that requests that operations be performed on an object while the "server" is an application that implements the operation on the object. Indeed, both the client and server application may reside on the same computer and within a common capsule, as discussed below. Most likely, however, the client and server application will reside on separate computers using different operating systems. The method of the present invention will be discussed with reference to two capsules running on separate machines.

II. Distributed Computing Environment

The method and apparatus of the present invention may be utilized within any distributed computing environment. In a preferred embodiment, the Common Execution Environment ("CEE") 75, 85, which is a component of the Tandem Message Switching Facility ("MSF") Architecture, is used. The CEE activates and deactivates objects and is used to pass messages between client and server applications loaded in CEE capsules. The CEE may be stored in the memory of a single machine. More likely, however, the CEE and client and server applications will be loaded on multiple machines across a network as shown in FIG. 1. The client-side CEE 75 is stored in the client memory 23. The server-side CEE 85 is stored in server memory 17.

Figure 2A:
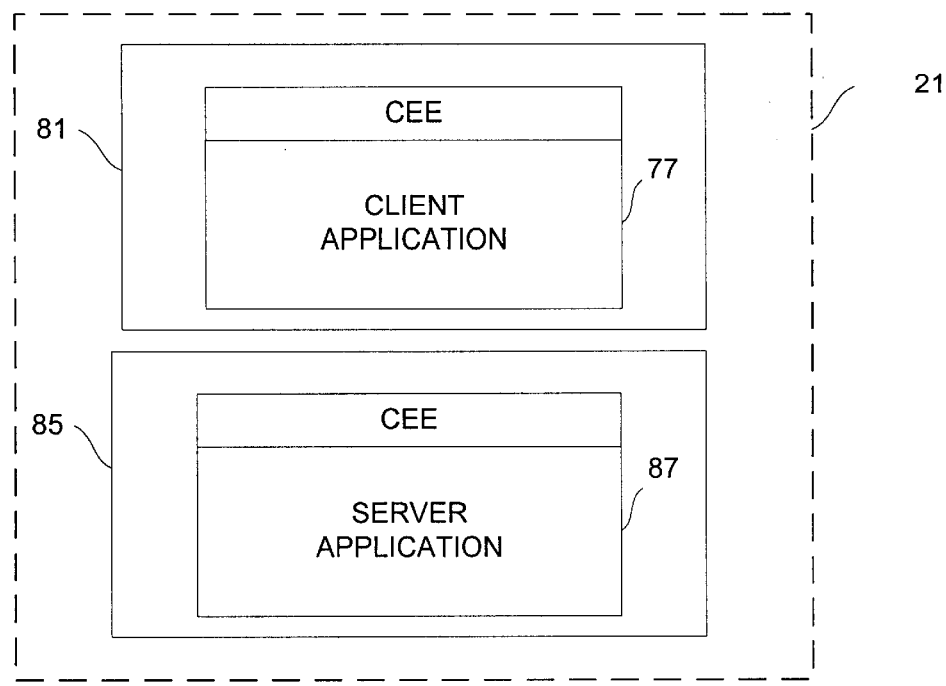
FIGS. 2a and 2b are diagrams of alternative configurations for Common Execution Environment capsules.
Figure 2B:
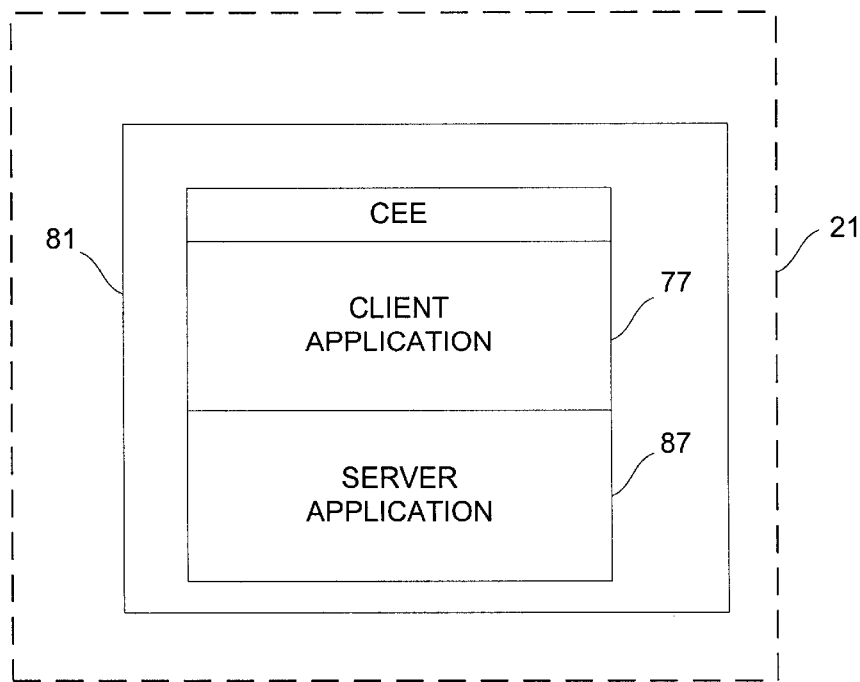

The CEE uses a "capsule" infrastructure. A capsule encapsulates memory space and one or more execution streams. A capsule may be implemented differently on different systems depending upon the operating system used by the system. For instance, on certain systems, a capsule may be implemented as a process. On other systems, the capsule may be implemented as a thread. Moreover, client and server applications may be configured within different capsules contained on different machines as shown in FIG. 1. Alternatively, the different capsules may be configured as shown in FIG. 2. FIG. 2a shows a client application 77 loaded in a single capsule 48 and a server application 87 may be loaded in a separate capsule 50. Both capsules, however, are stored on the same machine 44. Both the client and server applications may also be loaded within a single capsule 81 on the same machine 44 as shown in FIG. 2b. As stated above, the method of the present invention will be described with reference to the multiple capsule, multiple machine case. Accordingly, the client 12 and server machine 11 include a client-side CEE 75 and a server-side CEE 85 loaded in their respective memories.

Figure 3:
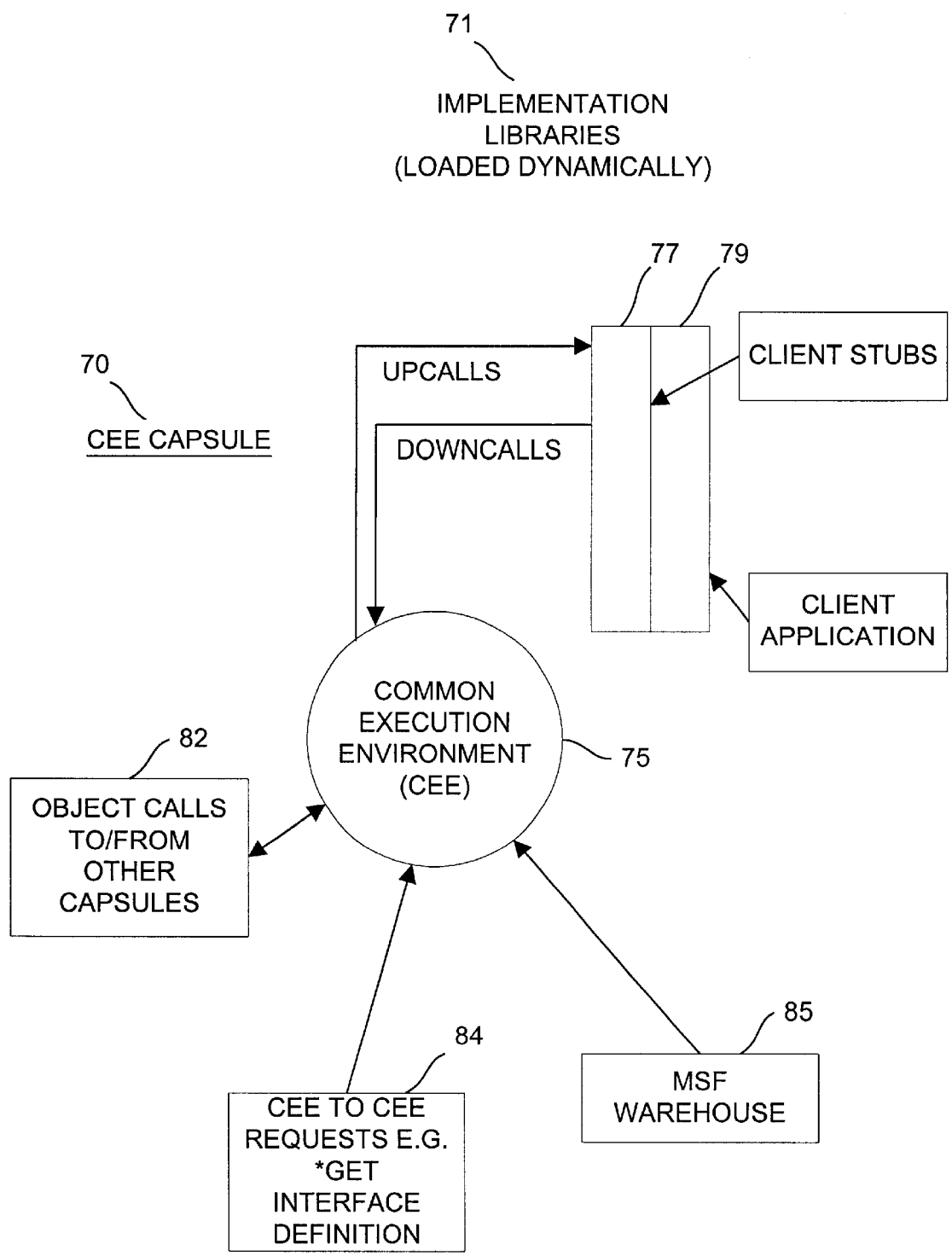
FIG. 3 is a diagram of a Common Execution Environment capsule and its core components.

FIG. 3 shows a CEE capsule 70 contained, for example, in a client computer memory 27 (not shown) that includes the CEE 75 and certain of the core CEE components and implementations of objects contained within Implementation Libraries 71. The Implementation Libraries 71 include the client application 77 (or the server application in the case of the server capsule) and client stubs 79 (or server stubs) generated from the IDL specification of the object's interface, as described below. The Implementation Libraries 71 and the CEE 75 interact through the down-calling of dynamically-accessible routines supplied by the CEE and the up-calling of routines contained in the Implementation Library. The CEE 75 can also receive object calls 82 from other capsules within the same machine and requests 84 from other CEE's. The client-side CEE 75 and the server-side CEE 85 may communicate using any known networking protocol.

Objects implemented in a CEE capsule may be configured or dynamic. Configured objects have their implementation details stored in a repository (such as the MSF Warehouse 85) or in initialization scripts. Given a request for a specific object reference, the CEE 75 starts the appropriate capsule based on this configuration data. The capsule uses the configuration data to determine which Implementation Library to load and which object initialization routine to call. The object initialization routine then creates the object. Dynamic objects are created and destroyed dynamically within the same capsule. Dynamic objects lack repository-stored or scripted configuration information.

III. Compiling and Linking IDL Source Files

Figure 4:
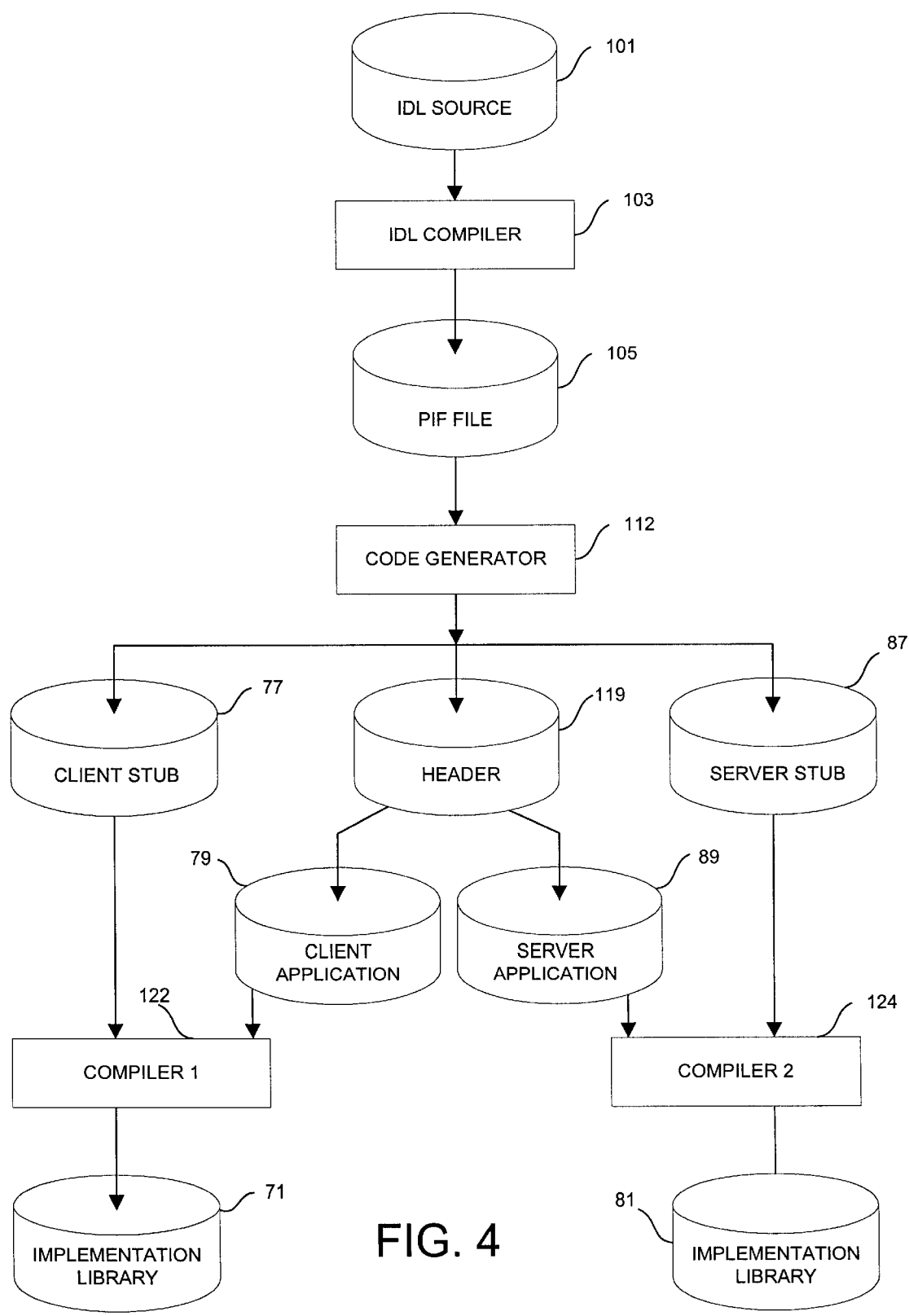
FIG. 4 is a diagram of the compilation of IDL source files.

FIG. 4 shows how IDL source files are compiled and linked into client and server applications that will utilize the method and apparatus of the present invention. First, an IDL source file 101 is prepared containing IDL interface definitions. An IDL compiler 103 compiles the source file 101. The IDL compiler 103 parses the code 101 to produce an intermediate Pickled IDL file ("PIF") file 105 for storage of the compiled source file. Creation of a PIF file is described in U.S. application Ser. No. 08/678,298 entitled "Data Structure Representing An Interface Definition Language Source File" by A. Schofield, filed Jul. 11, 1996. A code generator 112 then parses the PIF file. The code generator 112 generates files in the language of the client and server applications. If the client and server applications are in different languages, different code generators 112 are used. Preferably, the code generator 112 and the IDL compiler 103 are combined in a single application to produce language-specific code. The code generator 112 produces a client stub file 79 containing client stub functions and a server stub file 89 containing definitions for object implementations. The client stub functions include synchronous and asynchronous calls to the CEE 75. The client stub file 79 and the server stub file 89 are compiled by programming language-specific compilers 122, 124 to produce compiled client stub object code and compiled server stub object code. Similarly, a client application 77 and a server application 87 are compiled by programming-language-specific compilers to produce compiled client application object code and compiled server application object code. The client application 77 and the server application 87 also include a header file 119 generated by the code generator 112. The header file 119 contains common definitions and declarations. Finally, the compiler 121 links the client application object code and the client stub object code to produce an implementation library 71. Similarly, a second compiler links the server application object code server stub object code to produce another implementation library 81.

The code generator 112 produces a Compact IDL Notation ("CIN") and places it in the header file 119. Specifically, the code generator examines all of the compiled interfaces, operations, and operation parameters and defines an identifier (usually the name of the interface) and a character sequence that will be substituted for the identifier in the header file (using, for example, the #define macro in C++). As the code generator 112 parses a source file line-by-line, the code generator stores the sequence of characters in the memory of the computer containing the code generator. Once the entire source file has been parsed, the code generator produces an ASCII descriptor in the header file to be included by the client and server applications. The character sequence in the ASCII descriptor is produced based upon predetermined definitions known to the code generators, as discussed below.

An IDL source file contains one or more interface definitions and data type definitions ("typedefs"). The body of the interface contains several declarations. Constant declarations are used to specify the constants that the interface exports. Type declarations specify the type definitions that the interface exports. Exception declarations specify the exception structures that the interface exports. Attribute declarations specify the associated attributes exported by the interface. Operation declarations specify the operations that the interface exports and the format of each operation, including the name, return data type, parameter types, and exceptions. In a preferred embodiment, the method of the present invention is utilized to describe interface definitions, operation definitions, and individual data type definitions contained in a source file. The method of the present invention may, however, be utilized to describe constant definitions, exception definitions, and module definitions (a definition of interface collections).

IV. Generation of Compact IDL Notation

Figure 5:
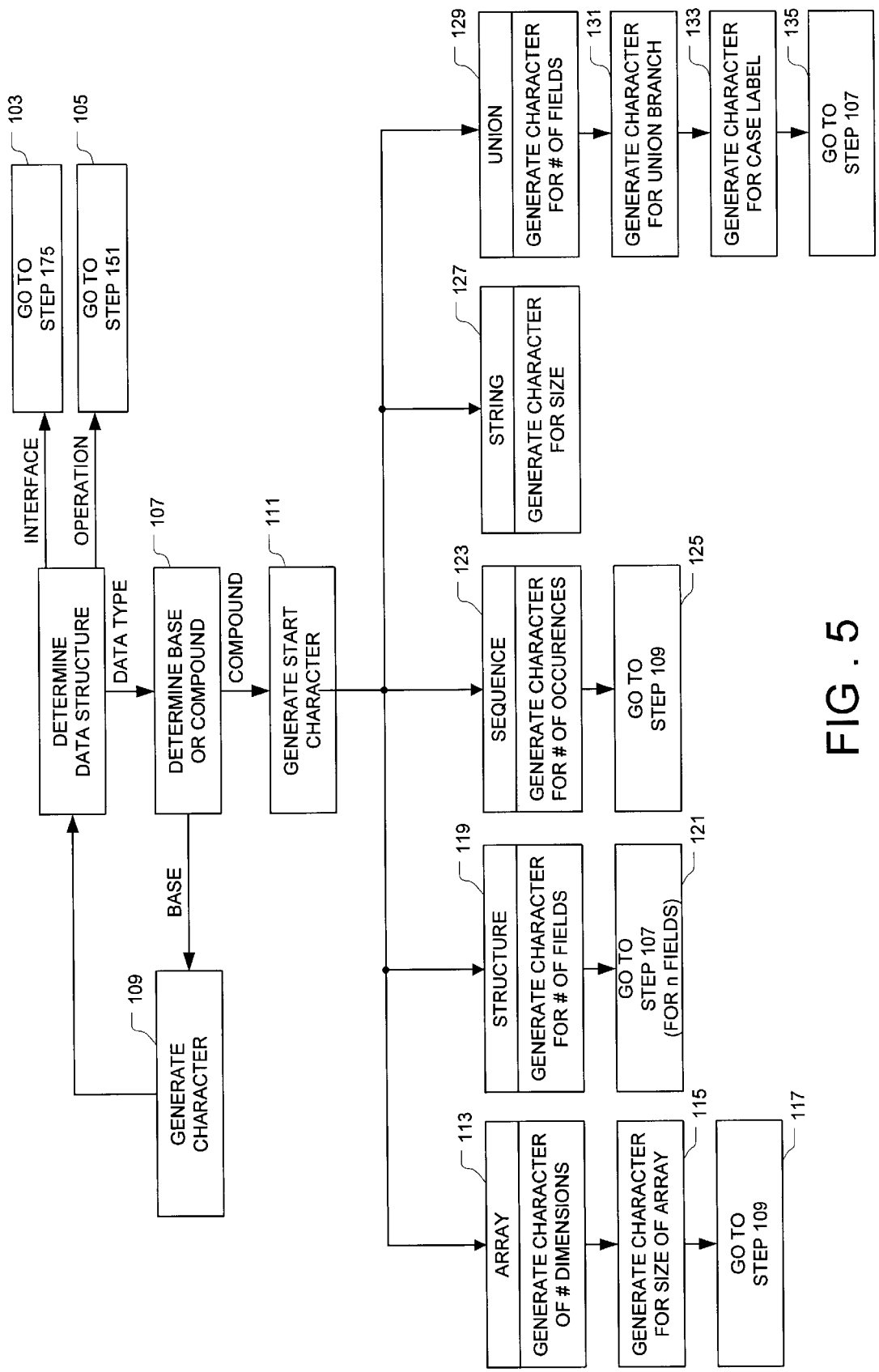
FIG. 5 is a flow chart depicting the generation of a CIN descriptor for base and compound data types.
Figure 6:
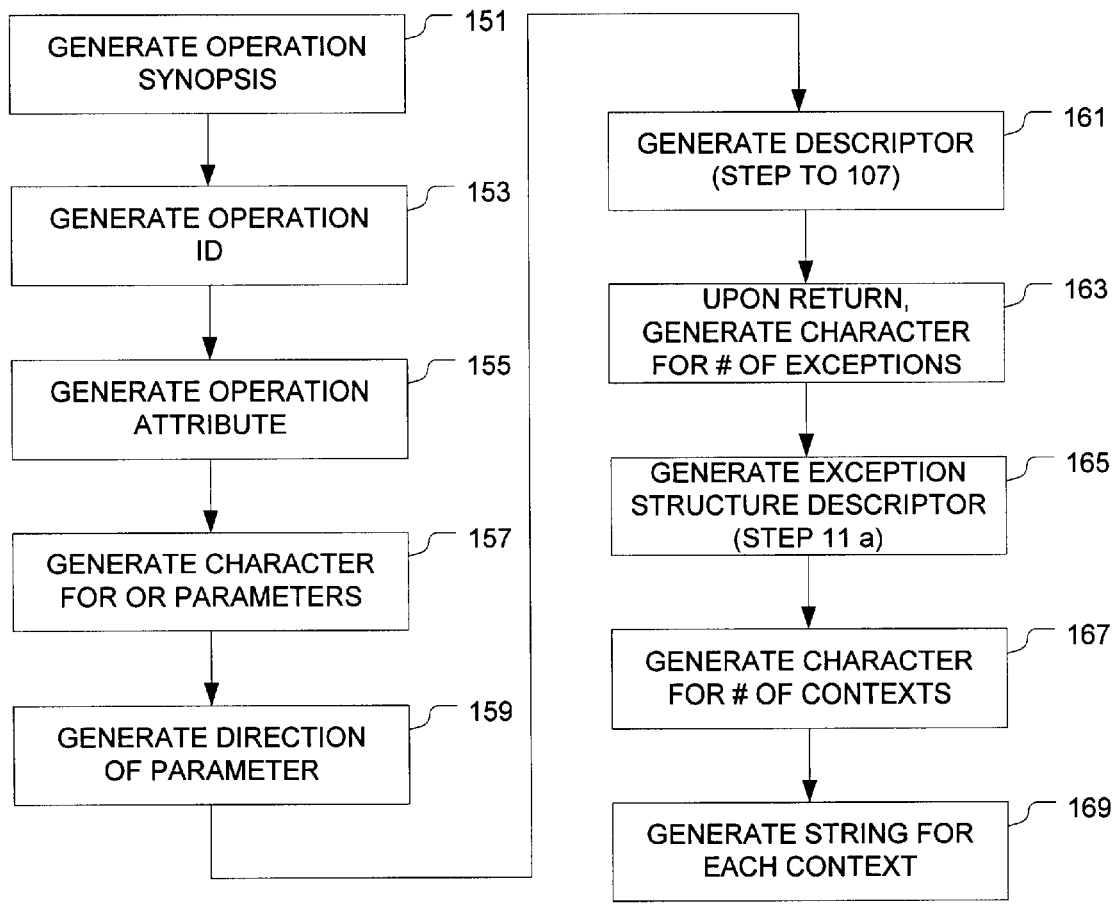
FIG. 6 is a flow chart depicting the generation of a CIN descriptor for an operation.
Figure 7:
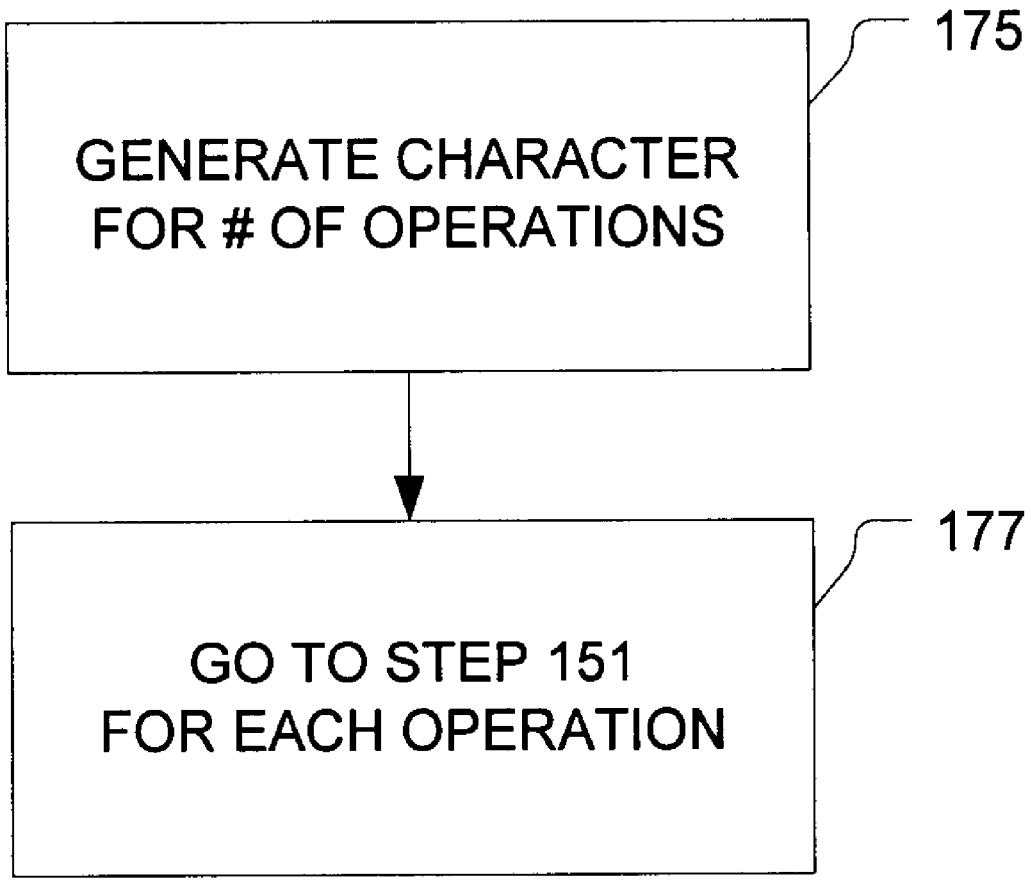
FIG. 7 is a flow chart depicting the generation of a CIN descriptor for an interface.

FIG. 5 is a flow chart depicting the generation of a CIN descriptor from an IDL data type, operation, and interface contained in an IDL source file. It will be understood that the steps of FIGS. 5–7 are implemented by a CPU of a data processing system executing computer instructions stored in memory. In step 101, the code generator 112 begins with the first line of the IDL source file and determines the data structure, interfaces, or operation described in the source file. If the described data structure is an interface, the code generator 112 follows the directions shown in FIG. 7. If the described data structure is an operation within an interface, the generator follows the directions in FIG. 6. If the data structure is a data type (or a parameter to an operation as discussed below), the generator generates a single character based upon a table of definitions. It should be noted that different characters may be used than those shown in the charts contained herein. Each chart contains only a preferred ASCII character. Chart A shows a preferred definition table that includes the character strings used to denote the various IDL base types.

| Chart A | |
|---|---|
| IDL Base Type | Representation |
| Any | A |
| Boolean | B |
| Char | C |
| Double | D |
| Float | E |
| Long | F |
| Long Long | G |
| Octet | H |
| Short | I |
| Unsigned Short | J |
| Unsigned Long | K |
| Unsigned Long Long | L |
| Void | M |

As shown in Chart A, simple character strings are used to represent base types in a CIN descriptor.

If the data type is a compound type, such as an array or structure (struct type), a series of different steps are followed. In step 111, a character is generated that indicates the start of the compound type. Chart B shows a sample table that includes the character strings used to denote the start of various IDL compound types.

| Chart B | |
|---|---|
| IDL Compound Type | Representation |
| Array | a |
| Struct | b |
| Sequence | c |
| String | d |
| Union | e |
| Union Branch | f |

The particular representation of each compound type is handled differently according to type.

IDL defines multidimensional, fixed-size arrays for each base type. The array size is fixed at compile time. Arrays are represented in CIN as follows:

a nr_dimensions size_1. [size_2, . . . size_n] base type

The generation of characters for the array is shown in Steps 113, 115, and 117. In this array representation, the character a represents the start of the array (as shown in Chart B). The character nr_dimensions is a numeral indicating the number of dimensions in the array. The characters size_1, size_2, size_n indicate the size of the array in the first, second, and nth dimension of the array, respectively. For each element of the array, base-type is the descriptor for each element. The representation for the various base types is derived from the original base type table shown in Chart A.

IDL defines user-defined struct types. Each struct is composed of one or more fields of base or compound data types. Structs are represented in CIN as follows:

b nr_fields field_1 [field_2 . . . field_n]

The generation of characters to describe a struct is shown in steps 119 and 121. As shown in Chart B, the character b indicates the start of the struct. The numeral nr_fields indicates the number of fields in the struct. The fields in the struct are described by the descriptors field_1, field_2, field_n. Each field is a base or compound type. Base type fields of the struct are described as shown in Chart A. Compound types are described as shown herein (i.e., arrays are described with the start character a along with the number of dimensions and the size of each dimension, etc . . . ).

IDL defines sequences of data types. A sequence is a one-dimensional array with two characteristics: a maximum size (fixed at compile time) and a length (determined at run time). Sequences are represented as:

c nr_occurrences base_type

The generation of characters for a sequence is shown in steps 123 and 125. In this representation, c indicates the start of the sequence as shown in Chart B. The character nr_occurrences specifies how many occurrences of the data type are included in the sequence. The number of occurrences is then followed by the actual descriptor, base_type, for each occurrence of the data type in the sequence. If the data type is a base type, the appropriate descriptor from Chart A is used. If the sequence consists of compound types, the descriptors are created as described herein. A sequence of sequences is possible.

IDL defines the string type consisting of all possible 8-bit quantities except null. A string is similar to a sequence of chars. Strings are represented in CIN as:

d size

The start of the string is indicated by the d character. The size of the string is represented by the size character generated in step 127.

In IDL, unions are a cross between the "union" of the C programming language and the C "switch" statement. In other words, the union syntax includes a "switch" statement along with a "case" label indicating the union branches. IDL unions must be discriminated; that is, the union header must specify a typed tag field that determines which union member to use for the current instance of a call. Unions and union branches are represented in CIN as follows:

e nr_fields f label_1 field_1 [f label_2 field_2 . . . label_n field_n]

The generation of characters to represent unions and union branches is shown in steps 129, 131, 133 and 135. In this representation, e indicates the start of a union and f indicates the start of a union branch within the union. The number of fields in the union is specified by the character nr_fields. The case label value for each field is indicated by the character label_1. If the field is a default, the label is omitted. The descriptor for each field, field_1, then follows. The union fields may be either a base or a compound type. Accordingly, the field descriptor for a base type may be generated based upon Chart A. Compound types are generated as described herein.

As seen from the descriptors for base and compound types, the CIN description does not include the identifiers contained in the original IDL source file and a generic descriptor is generated. Thus, even the most complex data structures can easily be represented in string format. The following is a sample structure originally described in IDL:

```
union coordinate_def switch (boolean) {
    case FALSE;
        struct cartesian_def {
            long x;
            long y;
        } cartesian;
    case TRUE;
        struct polar_def {
            unsigned long radius;
            unsigned long theta;
        } polar;
};
typedef sequence<coordinate_def, 100>coordinate_
    list_def;
```

Using the method of the present invention, the above-described data structure would be represented in CIN as:

"c100+e2+f0+b2+FFf1+b2+KK"

In a preferred embodiment, positive numerals are followed by a plus sign ("+"). Negative numbers are terminated by a negative sign ("−"). While negative numbers may not occur frequently, their use may be required for certain data types, such as union case labels (i.e., the case discriminator may be a negative number). The CIN descriptor shown above is explained as follows: A data structure consisting of a sequence (c) with a maximum 100 elements (100+), each element consisting of a union (e) with two fields (2+). If the discriminator is zero (FALSE) (f0+) then one variant is a struct (b) containing two fields (2). The first field is a signed long (F). The second field is a signed long (F). If the discriminator is 1 (TRUE) then (f1+) the second variant is a struct containing (b) two fields (2+). The first field is an unsigned long (K). The second field is an unsigned long (K).

If an operation is to be described in CIN, then the method continues at step 151. FIG. 6 is a flow chart depicting the steps followed in generating a descriptor for an operation. An operation descriptor is generated in CIN as:

operation_synopsis
    operation_id
    operation_attribute
    nr_params
    param_1, param_2 . . . param_n,
    nr_exceptions
    exception_1, exception_2 . . . exception_n
    nr_contexts
    context_1, context_2 . . . context_n In step 151, the code generator generates a unique integer, operation synopsis, that is derived from the string constituting the remainder of the operation's descriptor. The integer is derived by performing, for example, a cyclic redundancy check on the remaining characters in the CIN descriptor. Next, the code generator 112 generates a unique string, operation_id, derived from the original IDL name of the operation. Next, in step 155, the code generator generates operation_attribute, a character that indicates the attributes (none or "oneway") of the operation. For instance, if the operation has no oneway attribute, the character A is generated. If, however, the operation's attribute is oneway, the code generator generates the character B. The character nr_params is an integer that indicates how many parameters are included in the operation. If the operation has a non-void return type then the first parameter is the result. The param_1 descriptor includes a character that indicates the direction of the parameter (in, out, inout, or function result) followed by the actual parameter data type. The code generator 112, for example, generates the characters A, B, C, and D for the directions of in, out, inout, and function result, respectively. For the specific parameters, the method returns to step 107 in FIG. 5. When the data type of each parameter has been described, the number of exceptions is identified by the integer nr_exceptions. The structure description for each exception is then described by returning to step 119, which describes structures. The integer nr_contexts indicates the number of context names held by the operation. The names are then generated in strings, context_1, context_2, context_n.

The following are two sample operations originally described in IDL:

```
interface Math {
    long Add (in long x, in long y);
    long Subtract (in long x, in long y);
};
```

Using the method of the present invention, the above-described Add operation would be represented in CIN as:

126861413+3+ADDA3+DFAFAF0+0+

The CIN descriptor for the operation is described as follows. The beginning numeral (126861413) is derived from the remainder of the CIN by performing a cyclic redundancy check on the string "3+ADDA3+DFAFAF0+0+". The operation id contains three characters (3+). Those three characters are the string "ADD"—the operation id. All IDL identifiers must be unique and independent of case. Thus, operation id's are capitalized. The operation does not include the oneway attribute (A). The operation includes three "parameters" (3+). Since the function returns a result, the first "parameter" is actually a function result (D). The function result is a signed long (F). The next parameter (actually the first parameter) is an in parameter (A). The parameter is of typed signed long (F). The third parameter is an in parameter (A) of typed signed long (F). There are no exceptions (0+) and no contexts (0+).

Similarly, the CIN descriptor for the Subtract operation would be:

453399302−9+SUBTRACTA3+DFAF0+0+

Interfaces are similarly described using the method of the present invention. FIG. 7 shows the generation of interface descriptors. Interfaces are defined as follows:

nr_operations
operation_spec_1
operation_spec_2
operation_spec_n

The integer, nr_operations indicates how many operations are contained in the interface. Each operation is then described in operation_spec_1, operation_spec_2, operation spec n according to the above-described method for generating an operation descriptor. The code generator 112, thus goes to step 151 in FIG. 6 to describe each operation.

Using the method of the present invention, the above-described Math interface would be represented in CIN as:

2+126861413+3+ADDA3+DFAFAF0+0+453399302−9+SUBTRACTA3+DFAF0+0+

The interface includes two operations (2+). The operation descriptors for the Add and Subtract operations follow the character indicating the number of operations.

As stated above, the CIN descriptors are contained in a header file that is linked into both the client and server applications. Thus, both the client and the server can make use of the descriptor as each sees fit. The CIN may be used in many ways. For example, a CIN description of a data type may be useful in creating generic functions to pack and unpack structured data types. An example of this use is shown in U.S. application Ser. No. 08/680,203 entitled "Method and Apparatus for Transporting Interface Definition Language-Defined Data Structures Between Heterogeneous Systems" by A. Schofield, filed Jul. 11, 1996, now U.S. Pat. No. 5,860,072.

CIN descriptions may also be used to compare interfaces quickly. For example, a server application may have a header file containing two interfaces described in CIN. The server may then compare the ASCII string descriptions using known string comparison functions. If the server determines that the CIN descriptions are identical (or similar), the server may implement the operations of both interfaces using common methods in the server application. Thus, the CIN can be used to save time coding multiple methods for different (but similar) interfaces.

Having thus described a preferred embodiment of a method for describing IDL-defined data types, operations, and interfaces, it should be apparent to those skilled in the art that certain advantages of the within system have been achieved. It should also be appreciated that various modifications, adaptations, and alternative embodiments thereof may be made within the scope and spirit of the present invention.

What is claimed is:

1. A method for describing an Interface Definition Language-defined operation contained in a source file, the method performed by a data processing system having a memory, and comprising the steps of:

reading the source file; and generating a unique string descriptor in the memory, the string identifying the operation, wherein generating the unique string descriptor comprises:

generating a character that uniquely identifies the operation;

generating a character string derived from a name of the operation;

generating a character indicating an attribute of the operation;

generating a numeral indicating a number of parameters in the operation;

generating a character indicating a direction for each parameter in the operation;

generating a parameter descriptor indicating a data type for each parameter in the operation;

generating an integer indicating a number of exceptions that can be raised by the operation;

generating a descriptor indicating a structure of each exception that can be raised by the operation;

generating a numeral indicating a number of context names included in the operation; and generating a descriptor indicating a name of each context included in the operation.

2. The method for describing an Interface Definition Language-defined operation, as recited in claim 1, wherein, if the data type of a parameter to the operation is an Interface Definition Language base type, the step of generating a parameter descriptor further comprises the step of generating a character indicating the base type.

3. The method for describing an Interface Definition Language-defined operation, as recited in claim 1, wherein, if the data type of a parameter in the operation is an array having n dimensions, each dimension including an element of a base type, the step of generating a parameter descriptor further comprises the steps of:

generating a character indicating a start of the array;

generating a numeral indicating the number of dimensions in the array;

generating n numerals indicating the size of the array in each dimension; and generating a character indicating the base type for each element in the array.

4. The method for describing an Interface Definition Language-defined data type, as recited in claim 1, wherein, if the data type of a parameter in the operation is a struct having r fields, the step of generating a parameter descriptor further comprises the steps of:

generating a character indicating a start of the struct;

generating a numeral indicating the number of fields in the struct; and generating r data type descriptors indicating a data type for each field in the struct.

5. The method for describing an Interface Definition Language-defined data type, as recited in claim 1, wherein, if the data type of a parameter of the operation is a union having y fields, the step of generating a parameter descriptor identifying the data type of the parameter further comprises the steps of:

generating a character indicating a start of the union;

generating a character indicating a start of a union branch;

generating a numeral indicating the number of fields in the union;

generating y numerals indicating a case label value for each field; and generating y data type descriptors indicating a data type for each field.

6. The method for describing an Interface Definition Language-defined data type, as recited in claim 1, wherein, if the data type of a parameter of the operation is a sequence, the step of generating a parameter descriptor further comprises the steps of:

generating a character indicating a start of the sequence;

generating a numeral indicating a number of occurrences of a base type in the sequence; and generating an occurrence descriptor for each occurrence in the sequence.

7. The method for describing an Interface Definition Language-defined data type, as recited in claim 1, wherein, if the data type of a parameter of the operation is a string, the step of generating a parameter descriptor further comprises the steps of:

generating a character indicating the string; and generating a numeral indicating a number of characters in the string.

* * * * *

UNITED STATES PATENT AND TRADEMARK OFFICE
CERTIFICATE OF CORRECTION

PATENT NO.    : 6,263,485 B1
DATED         : July 17, 2001
INVENTOR(S)   : Andrew Schofield It is certified that error appears in the above-identified patent and that said Letters Patent is hereby corrected as shown below:

Drawings,
Sheet 1, Fig. 1, the reference numeral -- 42 -- should be applied to the box element labeled Display Device.
Sheet 2, Fig. 2A, delete the reference numeral "21" and insert in its place reference numeral -- 44 --; delete the reference numeral "81" and insert in its place reference numeral -- 48 --; delete the reference numeral "85" and insert in its place reference numeral -- 50 --.
Sheet 2, Fig. 2B, delete the reference numeral "21" and insert in its place reference numeral -- 46 --; delete the reference numeral "81" and insert in its place reference numeral -- 49 --.
Fig. 3 and Fig. 4, the reference numeral 79 should be applied to the element labeled Client Stubs; the reference numeral 77 should be applied to the element labeled Client Application.
Sheet 4, Fig. 4, the reference numeral 89 should be applied to the element labeled Server Stub; the reference numeral 87 should be applied to the element labeled Server Application.

Column 4,
Line 63, delete "33" and insert in its place -- 42 --.

Column 5,
Line 45, delete "44" and insert in its place -- 46 --.
Line 45, delete "81" and insert in its place -- 49 --.

Signed and Sealed this

Twelfth Day of November, 2002

*Attest:*

*Attesting Officer*

JAMES E. ROGAN
*Director of the United States Patent and Trademark Office*